7 Sheets—Sheet 3.
W. N. WHITELEY.
HARVESTER.
No. 176,390. Patented April 18, 1876.
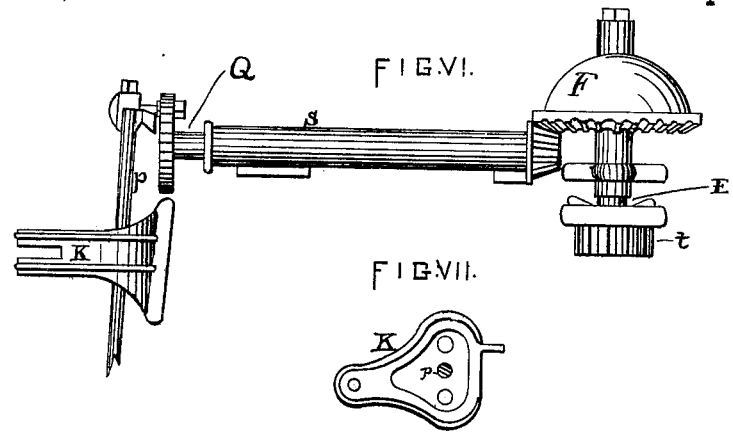
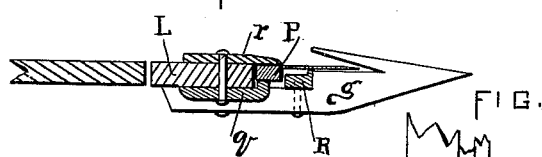
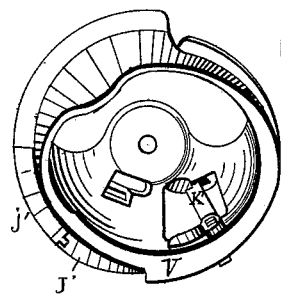
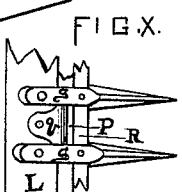
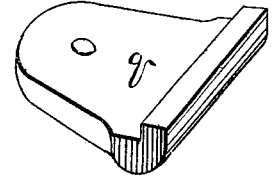
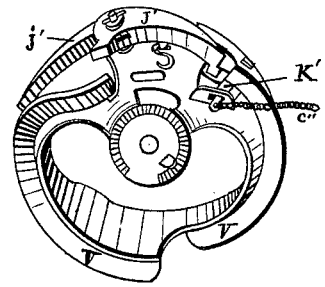
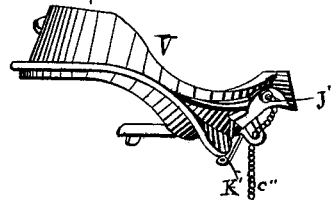
WITNESSES
F. B. Townsend.
N. B. Smith
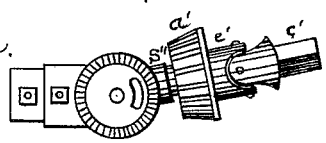
INVENTOR
Wm N. Whiteley
By his atty
R. D. O. Smith 7 Sheets—Sheet 4.
W. N. WHITELEY.
HARVESTER.
No. 176,390. Patented April 18, 1876.
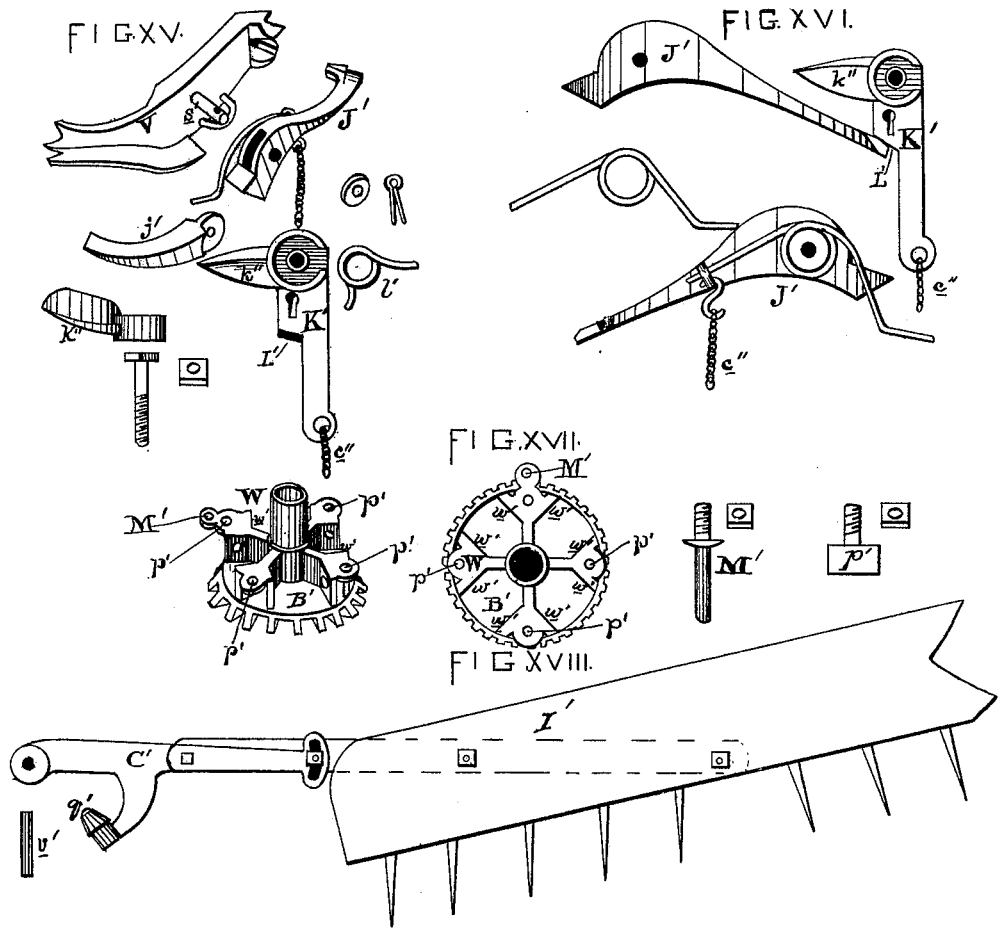
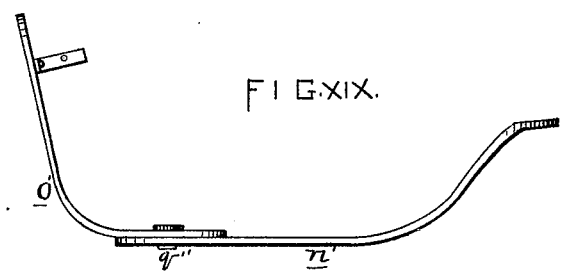
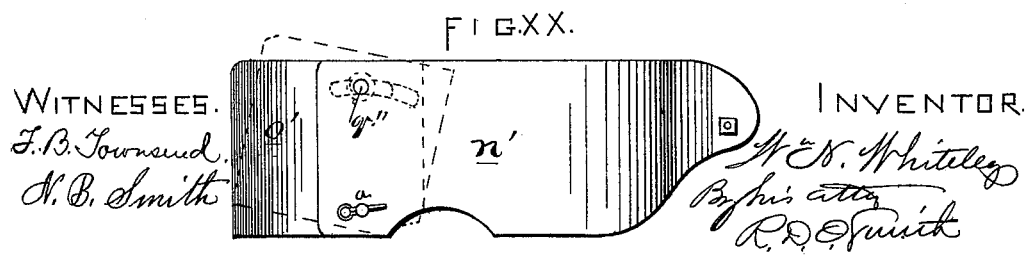
WITNESSES.
F. B. Townsend
N. B. Smith
INVENTOR.
W. N. Whiteley
By his atty
R. D. O. Smith

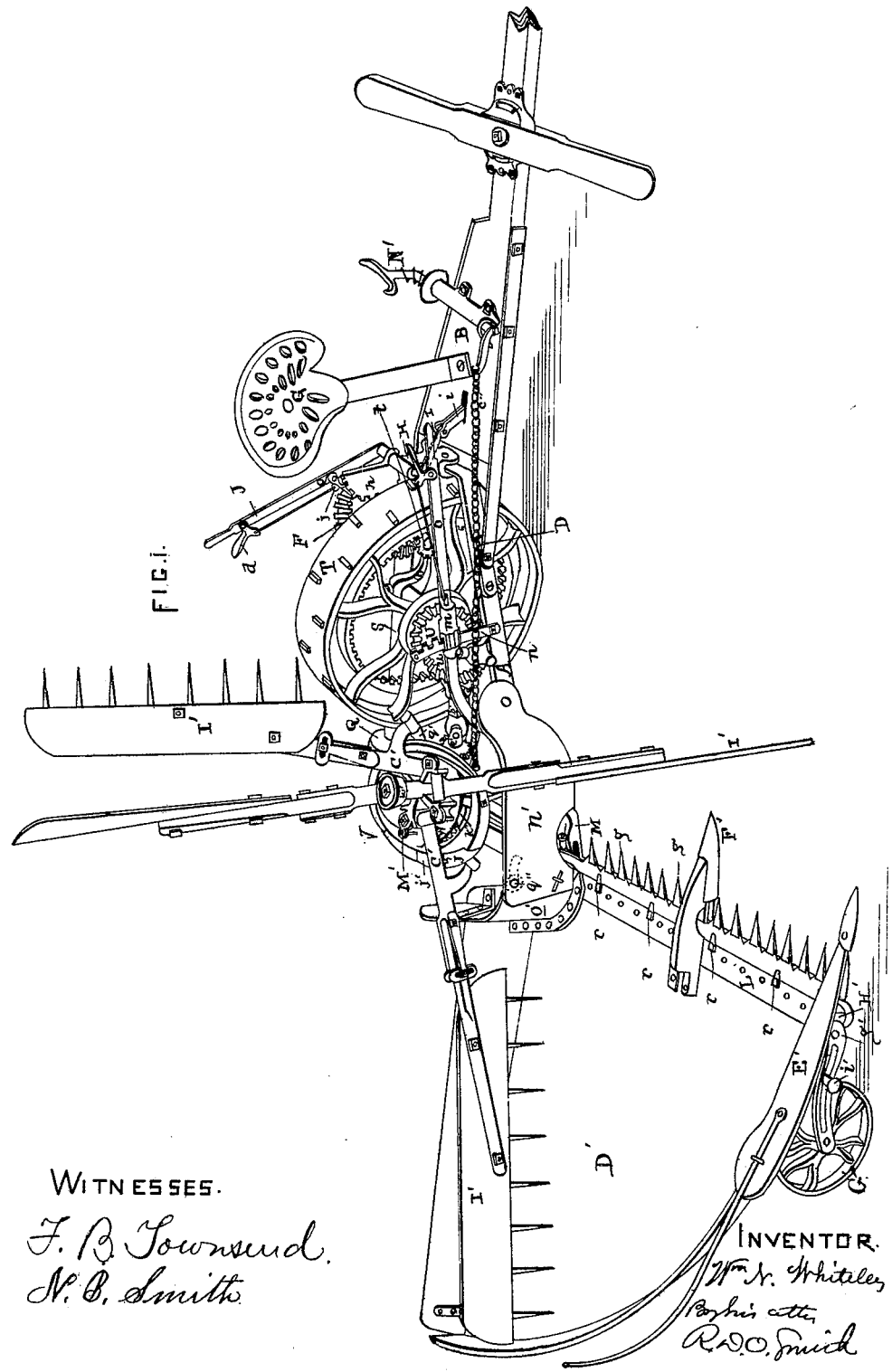

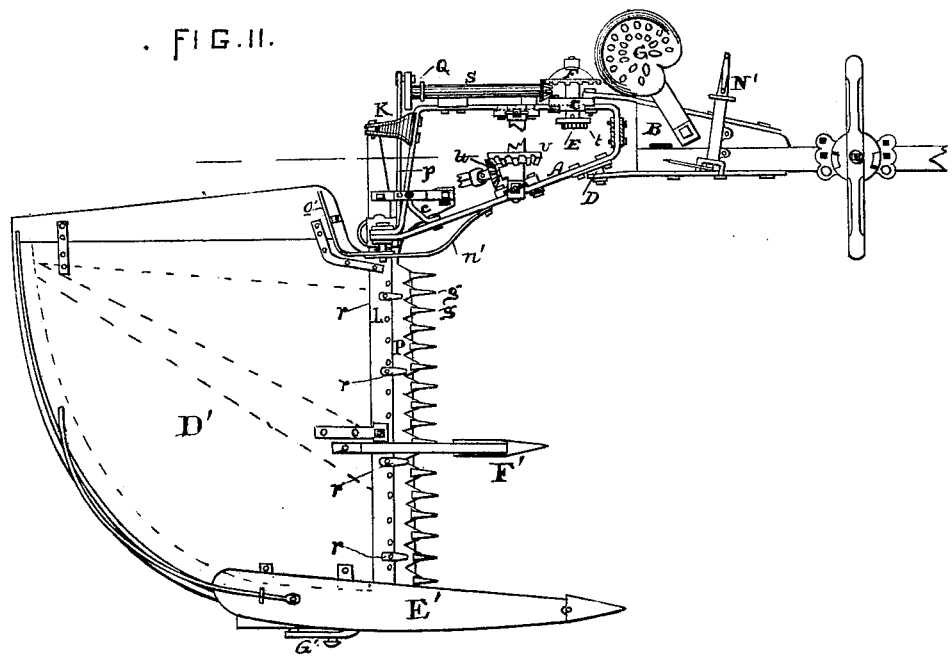
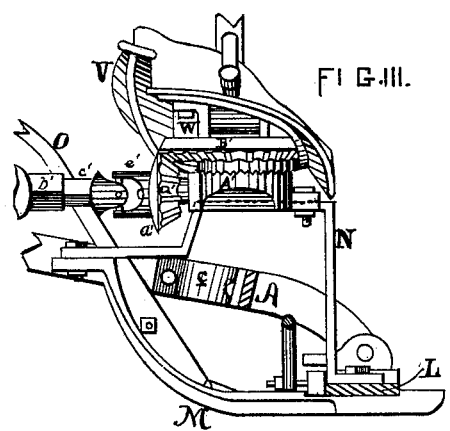
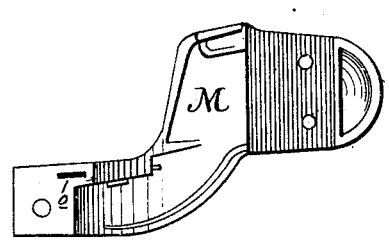
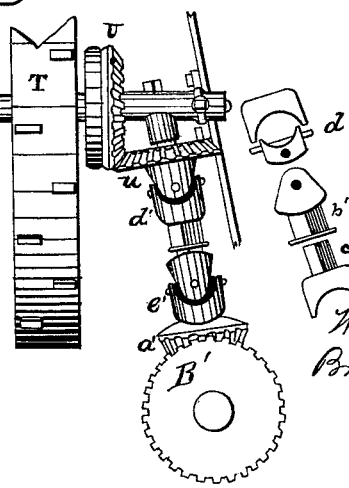

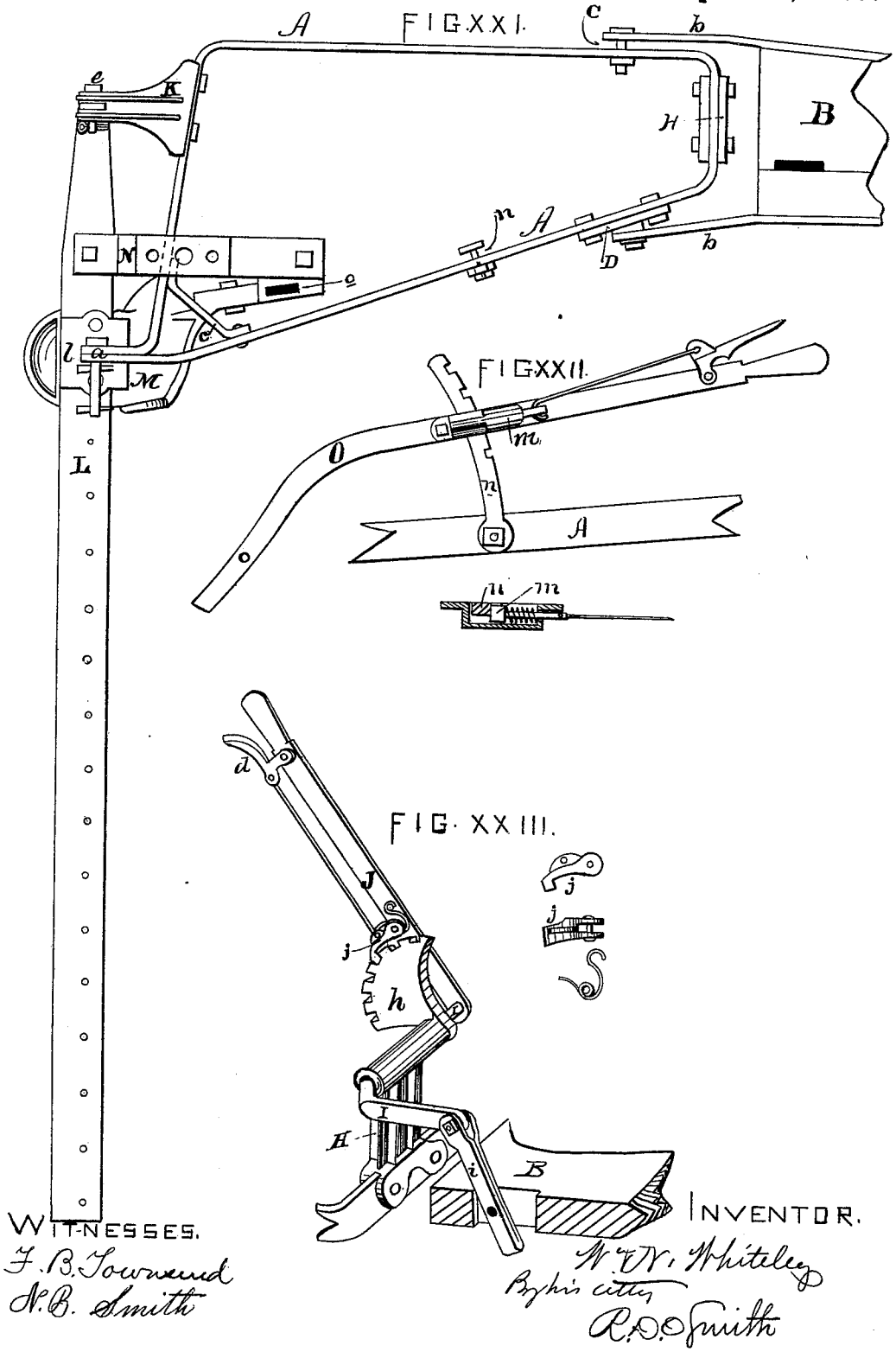

7 Sheets—Sheet 6.
W. N. WHITELEY.
HARVESTER.
No. 176,390. Patented April 18, 1876.
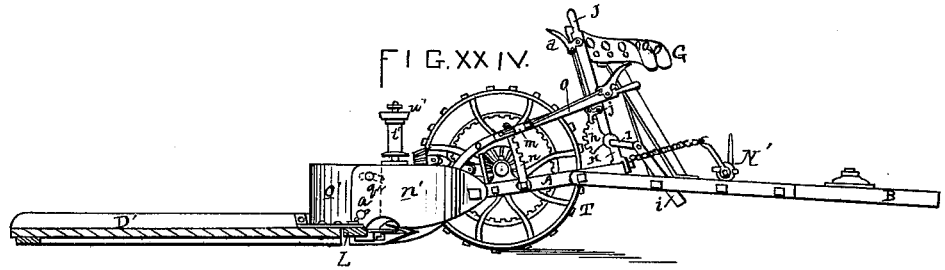
FIG. XXIV.
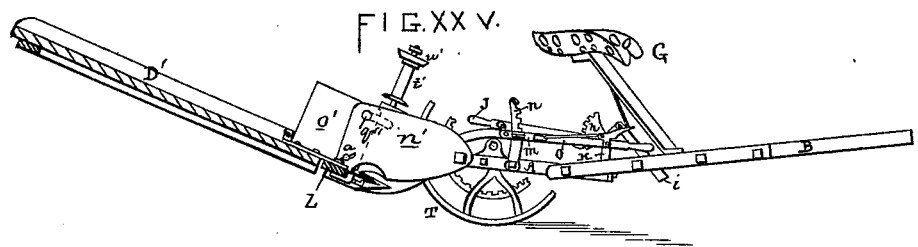
FIG. XXV.
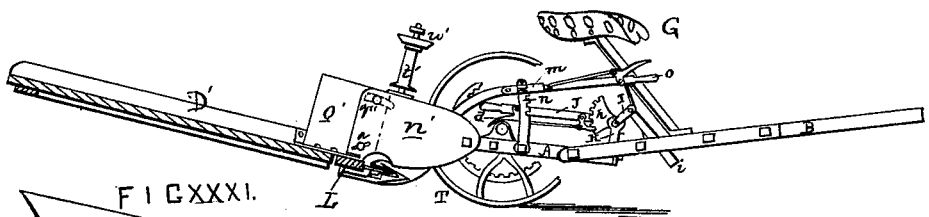
FIG. XXVI.
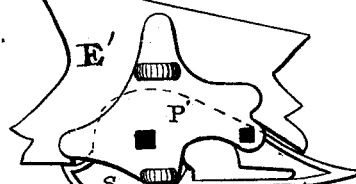
FIG. XXXI.
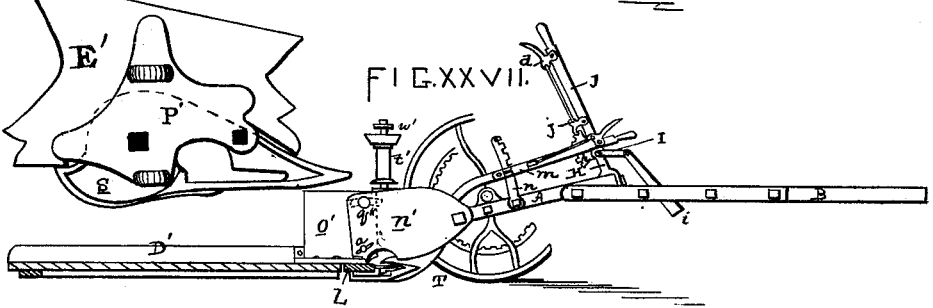
FIG. XXVII.
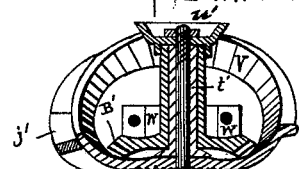
FIG. XXVIII.
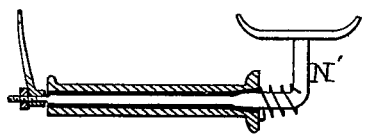
FIG. XXIX.
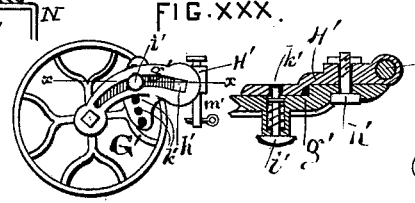
FIG. XXX.
WITNESSES:
F. B. Townsend.
H. B. Smith
INVENTOR.
W'm N. Whiteley
By his atty
R. D. Smith
N. PETERS, PHOTO-LITHOGRAPHER, WASHINGTON, D. C.

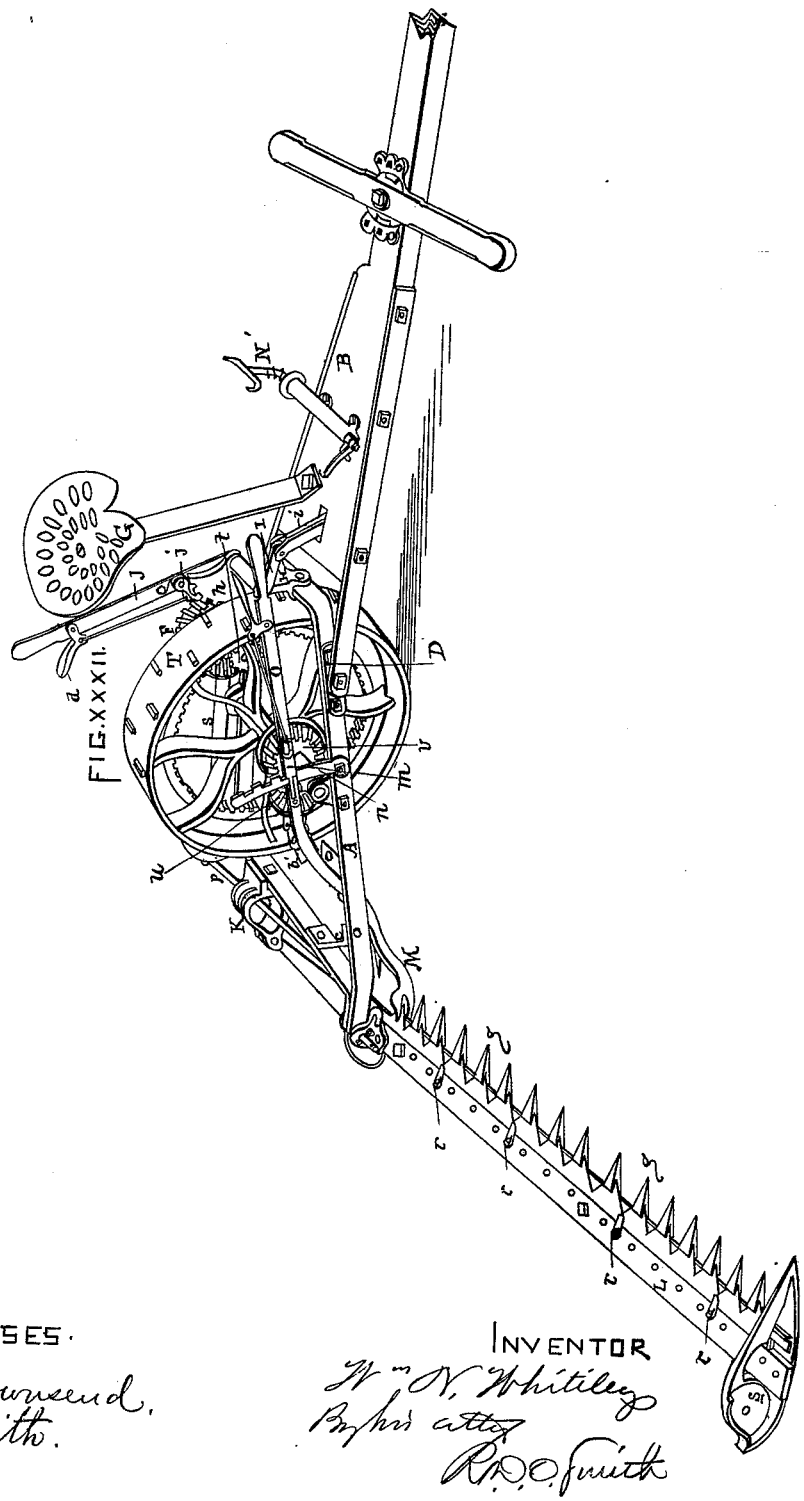
W. N. WHITELEY.
HARVESTER.
No. 176,390. Patented April 18, 1876.
FIG. XXXII.
WITNESSES.
F. B. Townsend,
N. B. Smith.
INVENTOR
Wm N. Whiteley
By his atty
R. D. O. Smith

UNITED STATES PATENT OFFICE.

WILLIAM N. WHITELEY, OF SPRINGFIELD, OHIO.

IMPROVEMENT IN HARVESTERS.

Specification forming part of Letters Patent No. 176,390, dated April 18, 1876; application filed May 25, 1875.

*To all whom it may concern:*

Be it known that I, WILLIAM NEEDHAM WHITELEY, of the city of Springfield, in the county of Clarke and State of Ohio, have invented a Reaping and Mowing Machine, of which the following is a specification:

This invention relates to improvements in machines for mowing and reaping; and it consists,—first, in an improved manner of constructing the main frame; second, in the manner of attaching the finger-beam to the main frame; third, in the device for controlling the angle of the tongue to the main frame; fourth, in the device for mounting and running the cutter-bar; fifth, in the manner of securing the guard-fingers; sixth, in the manner of communicating motion to the rake and reel; seventh, in the rake-supporting arch; eighth, in the rake-switch mechanism; ninth, in the jointed beam-shield.

That others may fully understand my invention I will more particularly describe it, having reference to the accompanying drawings, where—

Figure 1 is a perspective view of my machine fitted for reaping. Fig. 2 is a plan of the same. Fig. 3 is an elevation of the rake-stand and its supporting-bridge. Fig. 4 is a plan of the inner shoe. Fig. 5 is a plan of the driving-connection for the rake. Fig. 6 is a plan of cutters' driving-gear. Fig. 7 is an elevation of rear bracket. Fig. 8 is a transverse section of cutting apparatus. Fig. 9 is a perspective view of track-plate for cutter-bar. Fig. 10 is a bottom plan of cutter-bar, showing track-plate in position. Fig. 11 is a plan of the cam. Fig. 12 is a bottom plan of same. Fig. 13 is a side elevation of the same. Fig. 14 is a plan of the connecting-shaft to drive the rake and reel. Figs. 15 and 16 are details of the cam-switch. Fig. 17 represents the rake-stand in relation, plan, and detail. Fig. 18 is an elevation of the rake. Figs. 19 and 20 represent, in plan and elevation, the gearing-shield. Fig. 21 represents, in plan, my machine as a mower. Fig. 22 is an elevation of the shoe-lever. Fig. 23 is a perspective view of the tongue-controlling lever. Figs. 24, 25, 26, and 27 represent the machine in various adjustments as to position of cutting apparatus and the platform. Fig. 28 is a vertical section through rake head and stand. Fig. 29 is a longitudinal section of the foot-treadle. Fig. 30 is an elevation and section of the grain-wheel and the swinging arm. Fig. 31 is an outside elevation of the outer shoe and bracket-plate. Fig. 32 is a perspective view of the machine arranged as a mowing-machine.

A is the main frame, composed of a single continuous bar of wrought-iron or steel, in form of a truncated cone, as shown in Fig. 21, the two ends being brought together at the inner rear corner of the frame, and extended backward together for a short distance, to form a bracket or support for the pivot-bolt $a$, which unites the finger-beam at the shoe to the main frame. The tongue B is united to the main frame A by means of two metallic straps, $b$, one on each edge of said tongue, which extend backward along the outer side of said main frame to a point a little in advance of the pinion-shaft, and is there jointed to two cast plates, C D, which are securely bolted to the frame A at those several points. The cast plate C also forms the bearing for the pinion-shaft E, and a shield for the lower edge of the pinion-driver F. The tongue B is made broad at its rear end, so as to form a platform or foot-board for the driver, and to support the driver's seat G.

At the forward end of the main frame a cast-metal standard, H, is bolted, to support at its upper end a rack-segment, $h$, and a rock-shaft, I, which is connected, by a link, $i$, to the tongue B. The rock-shaft I is controlled by a lever, J, having attached to it a latch, $j$, and hand-piece $d$, so that at the will of the driver the front end of the main frame may be moved up and down by altering the angle of the tongue to said frame, the front end of the tongue being supported by the necks of the horses at a fixed distance from the ground. The rear inner corner of the main frame, where the two ends of the bar A come together, is strengthened by a brace, $c$. At the rear outer corner of the main frame a cast-iron bracket, K, is bolted. Said bracket projects backward in line with the bolt $a$, to form an outer joint for the finger-bar L, the outer end of which is bent upward, so as to form a lug, which projects into the slot of the bracket K, and is penetrated by the joint-bolt e. The bracket K is constructed with an upper and a lower branch, uniting at the back, as shown in Fig. 7, so as to leave an orifice through which the pitman p may pass. The joint-bolt a passes two lugs upon a cast plate, l, bolted to the top of the finger-bar, the same bolts securing a cast-metal shoe, M, to the under side of said finger-bar. The shoe M projects forward and upward, and is turned aside toward the center of the main frame. An arch or bridge plate, N, is bolted to the front end of the shoe M, and extends thence upward, backward, and downward to the surface of the finger-bar L, to which it is securely bolted. The forward end of the shoe M is provided with a socket, o, into which is fitted the rear end of a lever, O, which extends forward to a point convenient to the hand of the driver. It is also provided with a spring-latch, m, and a hand-piece. The latch engages with the notches of a segment rack-bar, n, which is jointed to the main frame-bar A, so that the lever O may be retained in any position desired.

By means of this lever the finger-bar is caused to rock on the joint-bolts a and e, to raise or lower the points of the guard-fingers and cutters as may be made desirable by the condition of the grass or grain which is being cut.

The cutting apparatus consists of the finger-beam L, with the usual open guards g g and the scalloped cutter P, running through said guards, and impelled by a pitman, p, from the crank-shaft Q, driven by the pinion-driver F. The cutters are secured to the upper side of the cutter-bar, and the latter is supported upon several guide-pieces, q q, which are riveted to the under side of the finger-beam. Said guides q are shown in Figs. 8, 9, 10. There may be, say, four of them, distributed at uniform intervals along the cutter-bar. The guide q has a flange along its front edge, the upper surface of which forms the bearing-surface for the cutter-bar, and lifts the same a little above the fingers g, as shown in Fig. 8. The rear edge of the cutter-bar runs against the front edge of the finger-bar, and its front edge is kept in place by the string brace-rod R, which is riveted to and supports the guard-fingers in advance of the finger-beam.

Plates r r, riveted to the upper side of the finger-beam, serve to keep the cutters down in proper place.

It will be observed that the cutter-bar is supported upon its guides at certain points only, and at all intervening points it runs in air. The object of isolating it as completely as possible is to prevent any accumulation of obstructing matter collected from damp grass, dust, &c.

The guides q are in width equal to the space between the fingers g, so that when riveted in place said guides act as braces to prevent any side movement of said fingers, and the fingers being tied together by the rod R, such bracing at a few points is sufficient for all.

It is, therefore, only necessary to employ one rivet to secure each guard-finger to the finger-beam, instead of two, as heretofore. The crank-shaft Q runs in a tubular box, S, which is bolted to the side of the main frame A. An ordinary divider-shoe, s, is placed at the outer end of the cutting apparatus.

The main driving-wheel T has its axle supported and fixed in boxes bolted to the opposite sides of the main frame A. A cog-rim is placed upon the outer side of said wheel to drive the main pinion t upon the pinion-shaft E. On the main axle, inside of the main wheel I, there is a bevel cog-wheel, U, which transmits motion to the rake-and-reel mechanism through bevel-pinion u, which runs upon a stud set in the inner box of the main axle.

The rake-cam V and stand W are mounted upon the bridge-arch N. The base-plate A' has upon its upper surface a radially-serrated face to seat the cam-plate, which is provided with a correspondingly-serrated face. A tie-bolt, r', with its head beneath the base-plate A', extends upward through an axial orifice in said base-plate and cam-plate, and through sleeve-stud t' which is set thereon. The sleeve-stud t' forms a bearing for the revolving rake-stand W, which is fitted thereto. Above the rake-stand, and fitted to the top of the stud t', there is a cap, u', and screw-nut on the bolt r', which confines said rake-stand and other parts in place. The cap u' prevents the rake-arms from falling over past the perpendicular so as to miss the proper engagement with the guide-cam V at the beginning of the descent toward the platform.

The rake-arm heads C' are jointed to the flanges w' on the upper surface of the wheel B', which flanges constitute the rake-stand W. The flanges w' are arranged in four parallel pairs, to receive the arm-heads of the four beaters or rakes I'. Said arms are pivoted to said stand W by the joint-bolts v', which are kept in place by the heads of the bolts p'.

The rake-cam guide V is constructed with a trackway for the friction-roller q' of the rake-arm head C', and said cam is provided with a switch to constitute a double track on the side of said cam next the platform, so that by opening or closing said switch the roller q' may be caused to follow the lower or upper of said camways at pleasure, and thereby be caused to rake the grain from the platform, or to pass clear above it. The switch is shown with its spring at J', and with its hinged tail-piece or bridge j' pivoted upon the same stud, s', with said switch. K' is the switch-latch, which is pivoted to the inner side of the camway, and kept in operative position by the spring l'. As shown in Fig. 16, the toe of the switch engages with the shoulder L', and is thereby kept down or open until the latch is withdrawn, when its spring immediately causes it to close and permit the next succeeding roller q' to pass under it. As the roller q' passes under the switch it engages with the rear end of the same, and lifts the same up, so as to force the switch to open again, when it is caught by the latch and held until the same is again released.

The latch K' may be released automatically by a pin, M', which, at each revolution of the wheel B', engages with the cam-surface k'' of the latch K', or it may be tripped by means of the cord or chain e'', which connects the latch-tail with the foot-crank N'.

When the grain is very light, and it is not desirable to sweep the platform so often as once during every revolution, the cord or chain e'' may be removed from the latch-tail and applied directly to the switch, whereby the same may be held or kept open as long as desired, and while so held the rakes will successively rise above the platform, and the grain will accumulate thereon. If the latch is tied or fastened back at such times the opening and closing of the switch will be dependent entirely upon the will of the driver.

The base-plate A' is bolted to the bridge N, and is constructed with a stud for the pinion a', which drives the wheel B', to the back of which the rake-arms C' are pivoted. The connection between the pinions u and a consists of a slip-shaft, b' c', and universal joints d' e' at each end, so that the movements of the rake, reel, and cutting apparatus may be independent of the movements of the main frame, so far as is required by the rocking of the cutting apparatus on the joints a e, without deranging in any degree the driving operation of said connecting-shaft b' c'.

When the machine is employed for mowing, the raking mechanism is removed, and the machine presents the appearance shown in Fig. 32.

When the machine is to be used for reaping, the raking mechanism is attached, and a platform, D', is secured, in the usual way, to the cutting apparatus. At the outer end of said platform there is the usual divider E', and a guide-tooth, F', is secured to the middle portion of the cutting apparatus.

The outer end of the cutting apparatus is supported upon a caster grain-wheel, G'. This grain-wheel is mounted at the end of an arm, g', which is jointed to the hinged arm H' at h', and is adjustable as to height by means of a latch-bolt, i', which engages in one or another of the series of holes k' in the end of the arm H'. The arm H' is hinged to the outer shoe s by means of the bolt m', which passes through lugs on the bracket-plate P', and said plate is bolted directly to the shoe s, without any intervening substance.

Heretofore it has been common to place the divider-board between the bracket and shoe; but I bolt the bracket to the shoe and secure the divider to the bracket, and thereby secure greater strength and convenience in handling.

A shield is required to prevent grain, &c., from becoming entangled with the driving mechanism of the rake, and a sheet-metal plate has been heretofore placed along the inner side of the inner shoe, and extending around the driving mechanism; but a continuous plate would not permit any movement of the shoe upon the joint a e. I therefore make the shield in two parts, n' o', the former being secured at its forward end to the side of the main frame A, and at its rear end to the joint-bolt a', the end of which is extended through said plate, and the same secured by a spring-key, as shown in Fig. 20. The part o' is secured to the platform D', and extends around behind the rake and reel stand. The end of the joint-bolt a also penetrates the part o', and the two parts of the shield are, therefore, jointed together on the axis of motion of the shoe and cutting apparatus, and partake of all the relative movements of the cutting apparatus and main frame. The upper edges of the shield are supported by a pin, q', which is secured in one part and passes through a curved slot in the other part.

Having described my invention, what I claim as new is—

1. The main frame, constructed of one single piece of wrought metal, with its two ends brought together at the point of connection with the finger-beam at the inner shoe, as set forth.

2. The main frame A, constructed of a single piece, with its ends brought together at the connecting-joint of the inner shoe, combined with the bracket K, attached to said main frame, and jointed to the inner or extended end of the finger-beam, as set forth.

3. The combination of the rod R in front of the knife-bar with the independent plates or supports q, fastened to the under side of the finger-beam, to form bearings for the bottom of the knife-bar above the level of the fingers.

4. The combination of the plates or supports q, fastened to the finger-beam and wedged firmly between the guards at the front edge of said finger-beam, and thereby preventing any side motion of the guards, whereby one rivet through each guard-finger is sufficient to fasten them securely to the finger-beam.

5. The switch J', provided with a loop on its under side, in combination with the cord or chain attached directly to said loop, and arranged as described, whereby said switch may be mounted upon a simple stud, instead of upon a rock-shaft, as heretofore, substantially as set forth.

6. The cam-guard constructed of two pieces, one part secured to the drag-bar and the other part secured to the platform, jointed together at a point coincident with the joint or hinge upon which the finger-beam rocks or turns, for the purpose of conforming to the oscillating movements of the cutting apparatus, substantially as shown and described.

WILLIAM N. WHITELEY.

Witnesses:
FRANK C. GOODE,
A. WADDLE, Jr.